Sept. 8, 1953        A. MARKS        2,651,564
CRYSTALLIZING APPARATUS
Filed April 12, 1946                          2 Sheets-Sheet 1
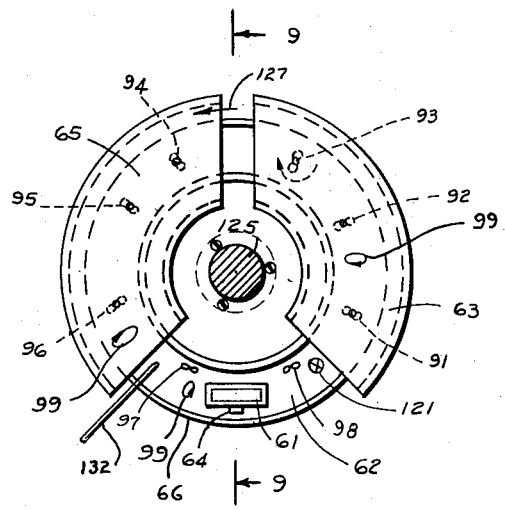
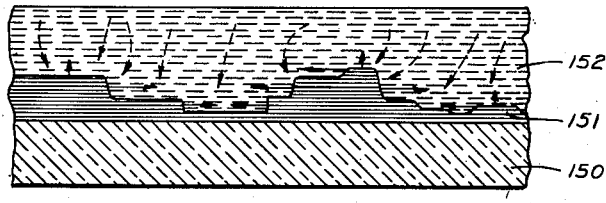
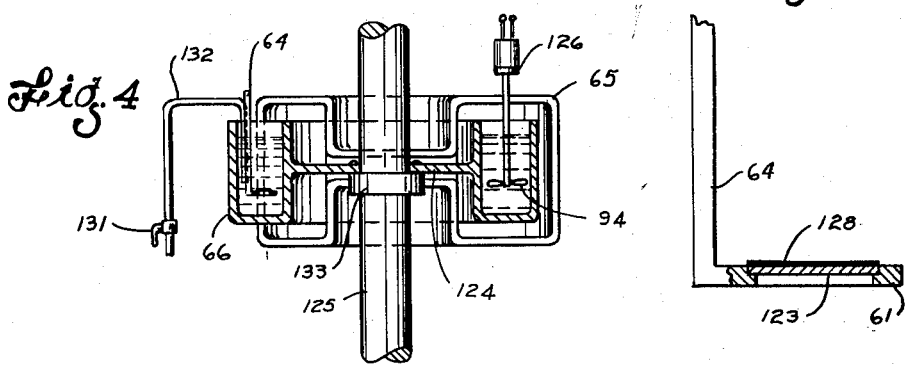
INVENTOR.
ALVIN MARKS
BY
*Pineles & Greene*
ATTORNEYS Sept. 8, 1953   A. MARKS   2,651,564
CRYSTALLIZING APPARATUS
Filed April 12, 1946   2 Sheets-Sheet 2

INVENTOR
ALVIN MARKS
BY
ATTORNEYS

Patented Sept. 8, 1953

2,651,564

UNITED STATES PATENT OFFICE 2,651,564

CRYSTALLIZING APPARATUS

Alvin Marks, New York, N. Y.

Application April 12, 1946, Serial No. 661,582

3 Claims. (Cl. 23—273)

This invention relates to a method and means for producing supersaturated solutions, and for growing crystal structures therein.

The present invention is a continuation-in-part of application Serial No. 313,392, now matured as Patent No. 2,398,435, filed January 11, 1940, in which certain novel methods for the manufacture of crystalline films by cleavage, are disclosed, including the step of building up the thickness of cleaved crystal-layer by the application of crystalline substances identical with, or isomorphous with, the cleaved crystalline layer.

It is well known that supersaturated solutions are in an unstable state, in which the solute is under pressure to crystallize-out; but cannot do so in the absence of nuclei, or seed crystals. Advantage is taken of this fact, by crystallizing-out, from supersaturated solution, on to "seed" bulk crystals; or, onto "seed" crystal-layers, as disclosed in the parent application.

Conventionally, it has been troublesome that such supersaturated solutions, have a tendency to spontaneously crystallize-out into myriads of tiny crystals, which then destroy the state of supersaturation; converting the solution to the "saturated" state in which seed crystals will neither grow nor dissolve. More serious, however is the tendency of the multitudes of tiny crystals formed under these circumstances, to foul the surfaces of the crystal being grown, and to make further regular crystallization thereon, difficult or impossible.

The usual practice of crystal-growth, employs only slightly supersaturated solutions which results in a slow growth onto the crystal. The degree of supersaturation may be measured by the degrees of temperature of the solution below the temperature at which the solution is saturated at the given concentration of solute. The conventional use of slightly supersaturated solutions is practiced by placing a bulk "seed" crystal in a saturated solution free of nuclei, and gradually lowering the temperature, during which time the concentration of solute also gradually decreases as the solute crystallizes out onto the bulk crystal being grown. Thus, with time, the crystal being grown is subjected to conditions of decreasing temperature and concentration. Such varying conditions make for undesirable changes in composition and other physical characteristics, with time, particularly with complex salts, or isomorphic growths. This factor has usually been reduced in importance by using a large volume of solute relative to the volume of the crystal-grown.

The fundamental limitations of present conventional practice thus are:

(1) Only a slight degree of supersaturation is permissible, to avoid excessive spontaneous crystallization. This permits only a very slow growth of crystals.

(2) a. Spontaneous crystallizing-out occasionally does occur, nevertheless, causing troublesome fouling of crystal surfaces, and cessation of growth.

b. When this occurs, the growing-crystals must be quickly transferred to a fresh supersaturated solution. This necessitates much careful handling and a constant vigil.

(3) During the course of crystallization concentrations and temperature decrease.

Accordingly, it is an object of this invention to intermittently or continuously supply fresh supersaturated solution to growing seed crystals.

It is a further object of this invention to provide apparatus for supplying supersaturated solution under conditions of constant temperature and concentration, and substantially free from nuclei so that the seed crystal may continue to grow under constant conditions without danger of fouling.

It is another object of this invention to furnish supersaturated solution of a relatively high degree of supersaturation, to facilitate rapid crystal growth.

It is another object of this invention to provide a motion of the supersaturated solution past the growing crystal.

It is a further object of this invention to supply fresh solution to a growing crystal and to remove supersaturated solution, when it is in the incipient crystallizing-out stage.

It is a further object of this invention to provide means for detecting the incipient crystallization of supersaturated solutions, and to provide means to remove the incipient-crystallizing solution from one growing crystal, and substitute fresh supersaturated solution therefor.

It is still another object of this invention to provide an apparatus for the general purpose disclosed, capable of operating with a relatively small volume of supersaturated solution, and to periodically replenish such solution, as the constituents are utilized in the process of crystal growth.

It is a further object of this invention to provide a process and apparatus for continuously supplying a supersaturated solution for growing any type of crystal.

It is a further object of my invention to provide a process and apparatus for supplying a supersaturated solution of the polarizing material for the intensification steps.

It is a further object of my invention to provide a continuous process and apparatus for supplying a supersaturated solution of the polarizing material for the intensification steps.

The novel features characteristic of this invention are set forth with particularity in the appended claims. The invention itself, however, both as to its organization and its method of operation, together with additional objects and advantages thereof, will be apparent from the drawings and the description thereof which follows:

Figure 1 is a schematic cross sectional showing of the accretion of the cleaved crystalline film of my invention.

Figure 3 is a plan view of an apparatus for continuously producing a supersaturated solution.

Figure 4 is a side view, partly in cross section, of the apparatus of Figure 3.

Figure 5 is a detail view showing the means for holding a film or base on which a crystal is to be built up.

Figure 2:
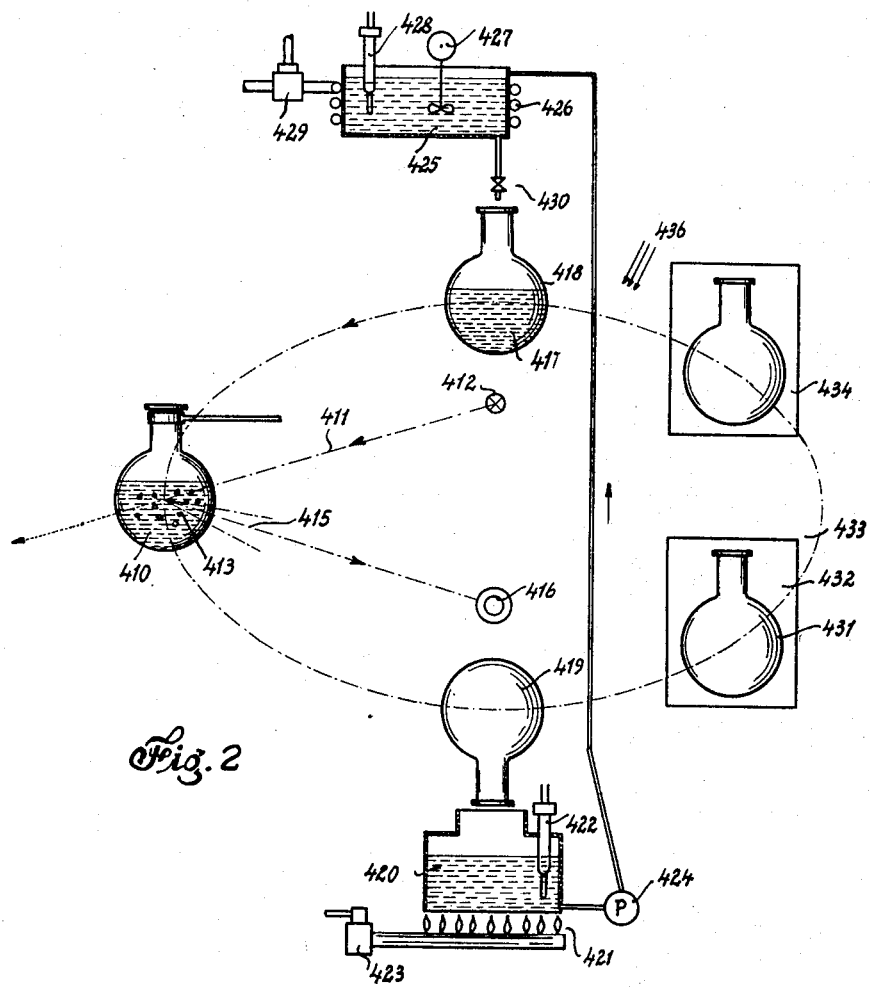
Figure 2 is a diagrammatic representation of a means for maintaining a supply of solution supersaturated for the purpose of the intensification step.

In Figure 1 I show diagrammatically the intensification or building up of the cleaved crystalline layer which is formed in my process. For purposes of illustration I have exaggerated the unevenness of the cleaved line and I have shown pits and holes in said crystalline layer. This intensification is illustrative of the building up or intensification of both the crystalline layer on the primary support such as glass as shown here, or on the secondary support such as a plastic film. The principles are exactly the same. Specifically in Figure 1, 150 represents the transparent rigid primary support and positioned thereon is the crystalline layer 151 which may be of iodocinchonidine sulphate-$a$ or iodo quinine sulphate or any suitable crystal which has the property of forming thin flat crystals of relatively large area and which have a substantially constant mass per unit area. This crystal has been cleaved as described in connection with Figure 1 and Figure 2 as described in Patent No. 2,398,435 and a counterpart of the uneven crystal 151 has been split and transferred to a secondary plastic film support on which it is to be similarly intensified. The crystalline film 151 on the support 150 is then subjected to a supersaturated solution 152 which comprises crystals similar to the crystals 151, or are of the same type or of substances which are isomorphous thereto, the requisite being that crystallization from the supersaturated solution will proceed upon the cleaved crystalline base to form a substantially continuous crystalline layer homogeneous or compatible therewith.

If the supersaturated solution is made of polarizing crystals such as iodocinchonidine sulphate-$a$, abbreviated I. C. S.-$a$, a preferred solvent is standard industrial denatured 3A ethyl alcohol: 1050 c. c.; water: 300 c. c.; dioxan: 320 c. c.; and I. C. S.-$a$: 19.2 grams. The solution is first heated to 70 degrees centigrade to dissolve all crystals and then cooled to 50° C. before application. The above solution will remain in saturated condition for extended periods of time (several hours) if the temperature is maintained at not less than 35° C. The solution should be carefully shielded from crystallization as seed crystals which may happen to enter the solution will cause the crystallization to occur relatively rapidly, which will make it necessary to employ a freshly prepared supersaturated solution to continue the process.

The presence of the dioxan seems to prevent the ready formation of nuclei within the supersaturated solution and also upon the surface to be intensified, thus preserving the supersaturated condition for longer periods of time and also producing a cleaner intensified film which is freer from excess crystalline debris which might otherwise deposit upon the top surface.

The supersaturated solution 152 so described is then applied to the cleaved crystalline layer 151 and the solute contained in the supersaturated solution then causes the accretion of the cleaved irregular crystalline layer 151 so that the crystal accretes laterally and vertically as indicated by the arrows in building itself up to a fuller and substantially uniform thickness. The substantially uniform thickness is a result of the natural tendency of the crystal to grow more rapidly in a lateral direction than in a vertical direction. I use longer lateral arrows and shorter vertical arrows to indicate the relative tendencies in the growth of the crystal faces.

In Figure 2 I show one means for constantly providing a supersaturated intensification solution 410 which corresponds to the intensification solution 152 shown in Figure 2. There is directed through this supersaturated intensification solution 410 a light beam 411 from a light source 412. Normally this light beam 411 passes through the transparent or substantially translucent solution 410 which is in a state of supersaturation, but when the crystals start to form in the solution light is reflected therefrom actuating a photocell 416. The actuation of the photocell causes a revolving table or other mechanism (not shown) to move the container to the next stage.

When the crystallization starts and the photocell is actuated the container with the crystals thereon is moved to the next stage where it is discharged as shown at 419 into the heating vat 420. On the next movement of the rotating table the container is moved to a washing stage where it is washed, for example, with ethyl alcohol containing 10–15% water (when I. C. S.-$a$ is the crystalline material). At the next stage 434 the washing solution is drained and at stage 436 air is employed to dry and also cool the container.

The container then passes to the charging stage 418. In the meantime, the solution discharged into vat 420 has been heated to cause the solution of the precipitated crystals and has been transferred, as by pump 424, to cooling vessel 425 which may be positively cooled by cooling apparatus 426 and 429. Suitable thermometers and regulating devices 422 and 428 are provided in vessels 420 and 425.

The container which has been washed free of all minute crystals which might serve as a seed for the development of crystals from the supersaturated solution is then filled with the solution from 425 and is ready for transfer to the feeding position.

The solution issuing from the pipe 430 is saturated. When this solution enters the cooled flash 418 it is further cooled to a condition of supersaturation, by virtue of the prior cooling, at 436, of the container 418. The solution 417 in container 418, is now supersaturated and crystal films, such as shown in Figure 5 may be dipped into this solution to rapidly build up their thickness. The dipping process may continue, either with the same crystal-layer or with many crystal-layers, until incipient crystallization occurs, as shown at the next stop, at 413.

Alternatively this process may be employed with bulk crystals, which are treated in the same manner as described with the crystal-layers.

A continuous process and apparatus for forming a supersaturated solution is shown in Figures 3 and 4. This comprises a circular or ring shaped trough 66 which is mounted for rotation on a shaft 125. The shaft contains a collar 133 for supporting the trough 66. Surrounding a part of the trough is a heating section 63 and surrounding another part of the trough is a cooling section 65. A considerable space is provided between the entrance to the heating section and the exit of the cooling section. This space is provided to allow for the removal and addition of liquid to the trough and in some cases for the dipping of sections of material to be treated in the trough. The heating section 63 may be heated in any suitable way as by hot gases or by electrical heating means, and similarly the cooling section 65 may be cooled in any desired way as by cold air or by cooling tubes. Spaced throughout the tank are small propellers 91, 92, 93, 94, 95, 96, 97 and 98 which are for agitating the solution and keeping it in constant motion. The agitators or propellers 91 to 98 give the solution a circulatory motion such as shown by the arrows at 99. These propellers may be driven in any way as by a belt and pulley means or by a small motor 126 as shown in Figure 4.

At 132 there is shown a siphon device for drawing the supersaturated or saturated solution from the trough just as the solution comes out of the cooling section. This siphon 132 may be provided with suitable valve means 131 so that the solution may be delivered at the desired rate. Solution which has become contaminated by precipitation of the dissolved material may be introduced for treatment at point 121 of Figure 3. Also, any make-up solution or replacement material necessary to make the process continuous may be added at this point.

At 61 there is shown a frame device having an arm 64 which projects outside of the trough and is held stationary in any suitable way. The frame 61 may take any desired shape depending primarily upon the size and shape of the support on which a crystal is to be formed or enlarged. When frame 61 is employed the crystal is built up or formed right in the apparatus of Figures 3 and 4. The support for the crystal to be formed or enlarged may be film 123 (see Figure 5) which may already contain a crystal formation 128 and may be the type of product formed according to the process of Figures 1 to 4.

In operation the trough rotates in the direction of the arrow 127. Solution entering at 121 or solution contaminated with crystals after passing the crystalline film on 61 is continuously passed through the heating section 63, whereby the solubility of the crystalline material is increased by the heat and the agitation and a saturated or slightly undersaturated solution is obtained. Rotation of the trough further carries the solution into the cooling section 65 and in cooling the solution becomes supersaturated. When the liquid leaves the cooling section it is in such a state of supersaturation that it will readily form or build up crystalline layers on seed crystals. The solution in its supersaturated condition is either delivered to the apparatus of Figures 1 to 4 or is allowed to deposit on the crystal layer 128 on the support 123 or onto one or more bulk crystals suspended in the solution at 61 in any suitable manner.

The process and apparatus of this invention may be employed to form large crystals of any kind of crystalline material and may also be employed to form continuous crystalline films from many substances. For example, a continuous film containing seed crystals may be continuously fed through the saturated solution where the frame 61 is located by means of suitable devices for maintaining the film submerged.

The foregoing detailed description of my invention, it will be understood, has been given by way of example only and I intend to be limited not by the details hereinbefore set forth, but only by the claims hereto appended.

I claim:

1. An apparatus for growing crystal structures comprising a vertically positioned shaft having a rotatable circular trough connected thereto, a separate stationary, heating element surrounding one sector of the circular trough, a separate stationary cooling element surrounding a second sector of the circular trough and a separate stationary support for mounting a seed crystal thereto, said support being located within the circular trough in the third sector thereof.

2. An apparatus for growing crystal structures, comprising a vertically positioned shaft having a rotatable circular trough connected thereto; said circular trough being adapted to hold a solution of a crystal solute; a separate stationary heating element surrounding one sector of the circular trough to heat said solution to undersaturation and dissolve any crystallized-out solute; a separate stationary cooling element surrounding a second sector of the circular trough to cool the solution from a condition of undersaturation to supersaturation, and a separate stationary support having a seed crystal mounted thereon and dipping into the supersaturated liquid in the trough in a third sector, said supersaturated solution flowing as a consequence of the rotary motion of the trough from the second sector to the third sector and thence to the first sector, the said supersaurated crystal seed thereby being caused to grow within the supersaturated solution.

3. An apparatus for growing crystal structures comprising a vertically positioned shaft having a rotatable circular trough connected thereto, and adapted to hold a solution of the crystalline material, said trough being adapted to revolve through three adjacent stationary sectors, the first sector containing stationary heating means located about the said circular trough for heating the solution to a temperature above the saturation temperature to dissolve crystallized-out solute, the second sector comprising stationary cooling means located about the said circular trough for cooling the solution to supersaturation and the third sector in which the crystal-growing occurs, having a stationary support adapted to hold a seed crystal in immersed position in the supersaturated solution delivered from said second sector.

ALVIN MARKS.

References Cited in the file of this patent

UNITED STATES PATENTS

| Number | Name | Date |
|---|---|---|
| 1,002,635 | Bratkowski | Sept. 11, 1911 |
| 1,589,956 | Hageman et al. | June 22, 1926 |
| 1,879,445 | Othmer | Sept. 27, 1932 |
| 2,204,180 | Gerlach | June 11, 1940 |
| 2,232,622 | Moses et al. | Feb. 18, 1941 |
| 2,329,024 | Albright | Sept. 7, 1943 |
| 2,459,869 | Christensen et al. | Jan. 25, 1949 |

OTHER REFERENCES

Ind. and Eng. Chem. (Anal. Ed.), vol. 2, 1930; pp. 207–213.